(12) United States Patent  (10) Patent No.: US 7,960,967 B2
Kobayashi  (45) Date of Patent: Jun. 14, 2011

(54) SEALING RING WITH A PULSAR RING FOR A ROTARY ENCODER

(75) Inventor: Naoto Kobayashi, Fukushima (JP)

(73) Assignee: NOK Corporation (JP)

( * ) Notice: Subject to any disclaimer, the term of this patent is extended or adjusted under 35 U.S.C. 154(b) by 387 days.

(21) Appl. No.: 12/225,495

(22) PCT Filed: Mar. 15, 2007

(86) PCT No.: PCT/JP2007/055175
§ 371 (c)(1),
(2), (4) Date: Sep. 23, 2008

(87) PCT Pub. No.: WO2007/114019
PCT Pub. Date: Oct. 11, 2007

(65) Prior Publication Data
US 2009/0153136 A1 Jun. 18, 2009

(30) Foreign Application Priority Data

Mar. 31, 2006 (JP) .................. 2006-098357

(51) Int. Cl.
*G01P 3/48* (2006.01)
*G01B 7/30* (2006.01)
(52) U.S. Cl. .................... 324/174; 324/207.25; 384/448
(58) Field of Classification Search .......... None
See application file for complete search history.

(56) References Cited

U.S. PATENT DOCUMENTS

| | | | | |
|---|---|---|---|---|
| 5,575,568 A | * | 11/1996 | Rigaux et al. | 384/448 |
| 5,969,518 A | * | 10/1999 | Merklein et al. | 324/173 |
| 2006/0076737 A1 | * | 4/2006 | Kobayashi | 277/317 |

FOREIGN PATENT DOCUMENTS

| | | |
|---|---|---|
| JP | 11-174068 A | 7/1999 |
| JP | 2002-81452 A | 3/2002 |
| JP | 2004-093554 A | 3/2004 |
| JP | 2005-009671 A | 1/2005 |
| JP | 2005042817 A * | 2/2005 |

* cited by examiner

*Primary Examiner* — Minh N Tang
(74) *Attorney, Agent, or Firm* — Harness, Dickey & Pierce, P.L.C.

(57) ABSTRACT

A pulsar ring for a rotary encoder has a mounting ring (1) made of a non-magnetic material, with one end being fixed to an inner ring (202) at the rotation side and the other end being positioned in proximity to an outer ring (201) at the stationary side via labyrinth-shaped clearances ($G_1$, $G_2$, $G_3$), a pulsar ring body (2) formed by a synthetic resin material or rubber-like elastic material mixed with magnetic powder, magnetized to have multiple poles, and integrally installed on an inner surface of the mounting ring (1), and a seal ring (3) disposed inside the mounting ring (1), fixed to the inner ring (202) via the mounting ring (1), and slidably in contact with the outer ring (201), whereby the pulsar ring is hardly exposed to disturbances by foreign matters, muddy water, and external magnetic fields from the outside, and consequently can maintain a stable magnetic pattern.

2 Claims, 4 Drawing Sheets

SEALING RING WITH A PULSAR RING FOR A ROTARY ENCODER

CROSS REFERENCE TO RELATED APPLICATIONS

This is a national stage of the International Application No. PCT/JP2007/055175 filed Mar. 15, 2007 and published in Japanese.

BACKGROUND OF THE INVENTION

1. Field of the Invention

The present invention relates to a pulsar ring of a magnetic rotary encoder for detecting a rotation.

2. Description of the Conventional Art

FIG. 4 is a sectional view showing a conventional pulsar ring for a rotary encoder integrally provided in a sealing apparatus 100 for sealing a bearing portion of a wheel suspension apparatus for a motor vehicle by cutting it along a plane passing through an axis O. This kind of sealing apparatus 100 is also called as a hub seal, and is incorporated between end portions of an outer ring 201 and an inner ring 202 of a bearing 200 so as to prevent muddy water or the like from intruding into a bearing inner portion B from a bearing outer portion A.

In particular, the sealing apparatus 100 shown in FIG. 4 is provided with a metal-made mounting ring 101 which is pressure-inserted and fitted to an inner peripheral surface of the outer ring 201 of the bearing 200, and a side lip 102 and a radial lip 103 which are integrally provided in the mounting ring 101, and the side lip 102 and the radial lip 103 are slidably brought into close contact with a slinger 104 tightly fitted to an outer peripheral surface of the inner ring 202. In detail, the side lip 102 and the radial lip 103 are made of a rubber-like elastic material, and are integrally adhered by vulcanization to the mounting ring 101 via a common base portion 102a. The side lip 102 is structured such that a leading end is slidably brought into close contact with an inner side surface of a seal flange portion 104a of the slinger 104, and the radial lip 103 at an inner peripheral side thereof is structured such that an inner peripheral edge of a leading end directed to an outer side is slidably brought into close contact with an outer peripheral surface of a sleeve portion 104b of the slinger 104.

A pulsar ring 105 is integrally provided on an outer side surface of the seal flange portion 104a of the slinger 104, and the pulsar ring 105 is formed by a magnetic rubber made by mixing a magnetic material to a rubber-like elastic material and is magnetized so as to be multipolar at a predetermined pitch in a circumferential direction. Further, a magnetic sensor 120 is arranged at an outer side of the pulsar ring 105 oppositely thereto in a non-rotating state. The magnetic sensor 120 constructs a rotary encoder together with the pulsar ring 105, and is structured such as to generate a pulse having a wave form corresponding to a change of a magnetic field caused by a rotation of the pulsar ring 105 together with the inner ring 202 of the bearing 200 and detect the rotation (refer to Japanese Unexamined Patent Publication No. 2004-93554).

However, conventionally, since the pulsar ring 105 made of the magnetic rubber is provided on the outer side surface of the seal flange portion 104a of the slinger 104, the pulsar ring 105 tends to be exposed to an external disturbance caused by a foreign matter, muddy water, an external magnetic field or the like from the bearing outer portion A. Accordingly, a reduction and a turbulence of magnetic force tend to occur, and it is hard to maintain a stable magnetic pattern.

SUMMARY OF THE INVENTION

Problem to be Solved by the Invention

The present invention is made by taking the points mentioned above into consideration, and a technical object of the present invention is to make a magnetic field of a pulsar ring hard to be exposed to an external disturbance caused by a foreign matter, muddy water, an external magnetic field or the like from the outside, thereby maintaining a stable magnetic pattern.

Means for Solving the Problem

As a means for effectively solving the technical problem mentioned above, in accordance with a first aspect of the present invention, there is provided a pulsar ring for a rotary encoder, comprising:

a mounting ring made of a non-magnetic material, with one end being tightly fitted and fixed to a rotary side member and the other end being positioned in proximity to a stationary side member via a labyrinth-shaped clearance; and a pulsar ring main body formed by a synthetic resin or a rubber-like elastic material mixed with magnetic powder, magnetized so as to have multiple poles and integrally provided on an inner side surface of the mounting ring.

Further, in accordance with a second aspect of the present invention, there is provided a pulsar ring for a rotary encoder as recited in the first aspect, wherein the pulsar ring further comprises a seal ring arranged in an inner side of the mounting ring, tightly fitted and fixed to one of the rotary side member, and the stationary side member and slidably brought into close contact with the other.

Further, in accordance with a third aspect of the present invention, there is provided a pulsar ring for a rotary encoder as recited in the second aspect, wherein the pulsar ring main body is brought into close contact with the seal ring.

Effect of the Invention

In accordance with the pulsar ring for the rotary encoder on the basis of the first aspect of the present invention, since the mounting ring is made of a non-magnetic material, it is possible to detect a magnetic field of the pulsar ring main body provided on the inner side surface of the mounting ring by a magnetic sensor arranged at the outer side of the mounting ring. Further, since a labyrinth seal effect can be achieved between the mounting ring and the stationary side member, the pulsar ring main body is protected by the mounting ring, and is hardly exposed to an external disturbance caused by a foreign matter, muddy water, an external magnetic field or the like in the outside, and it is possible to maintain a stable magnetic pattern.

In accordance with the pulsar ring for the rotary encoder on the basis of the second aspect of the present invention, since the seal ring is arranged in the inner side of the mounting ring, it is possible to preferably apply it for a hub seal with a rotary encoder for sealing a hub bearing in a vehicle, for example.

In accordance with the pulsar ring for the rotary encoder on the basis of the third aspect of the present invention, since a seal function is given also to the pulsar ring main body, it is possible to further increase a sealing function obtainable by the seal ring in the second aspect.

DETAILED DESCRIPTION OF PREFERRED EMBODIMENT

Figure 1:
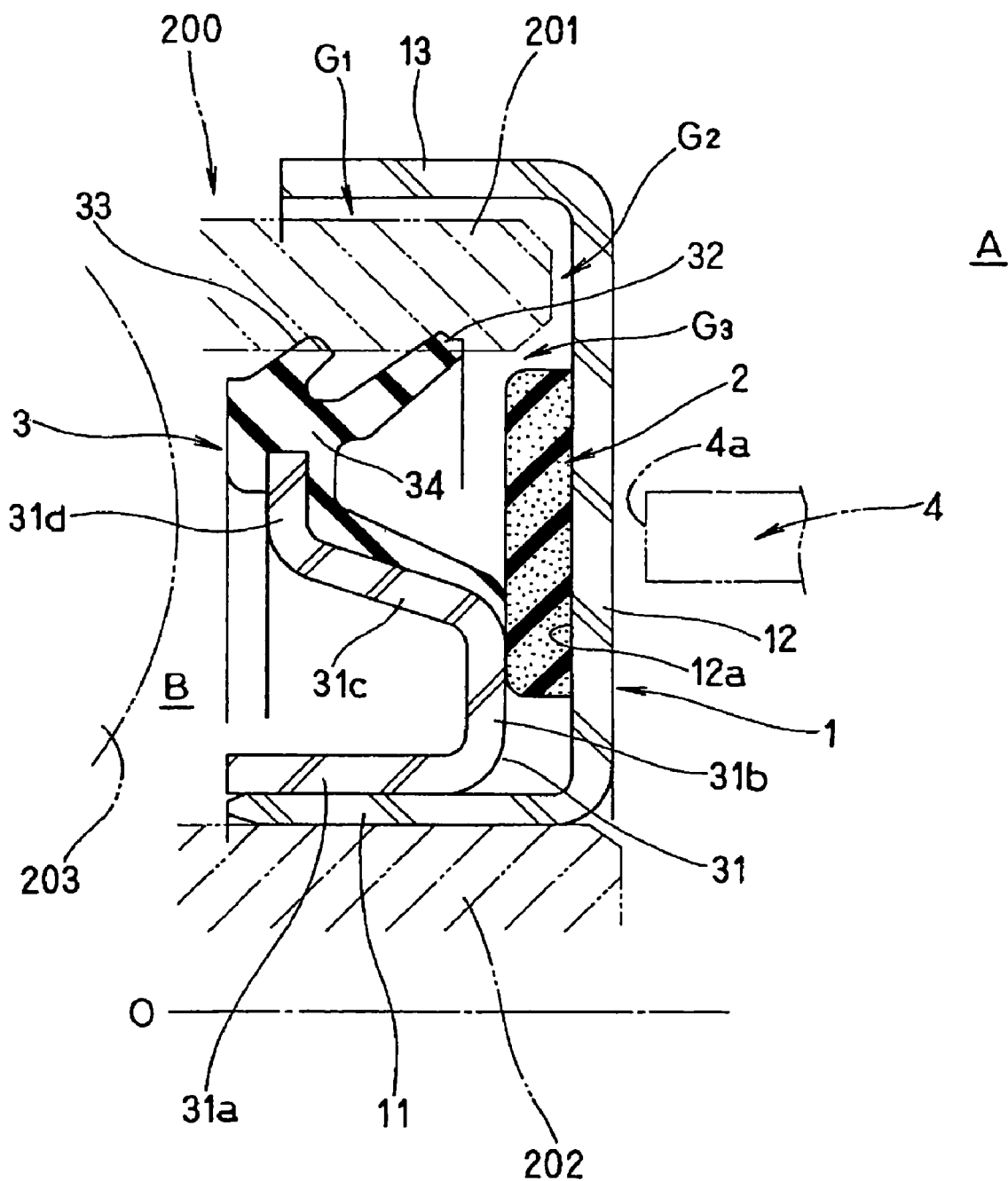
FIG. 1 is a sectional view showing a pulsar ring for a rotary encoder in accordance with a first embodiment of the present invention by cutting it along a plane passing through an axis O.
Figure 2:
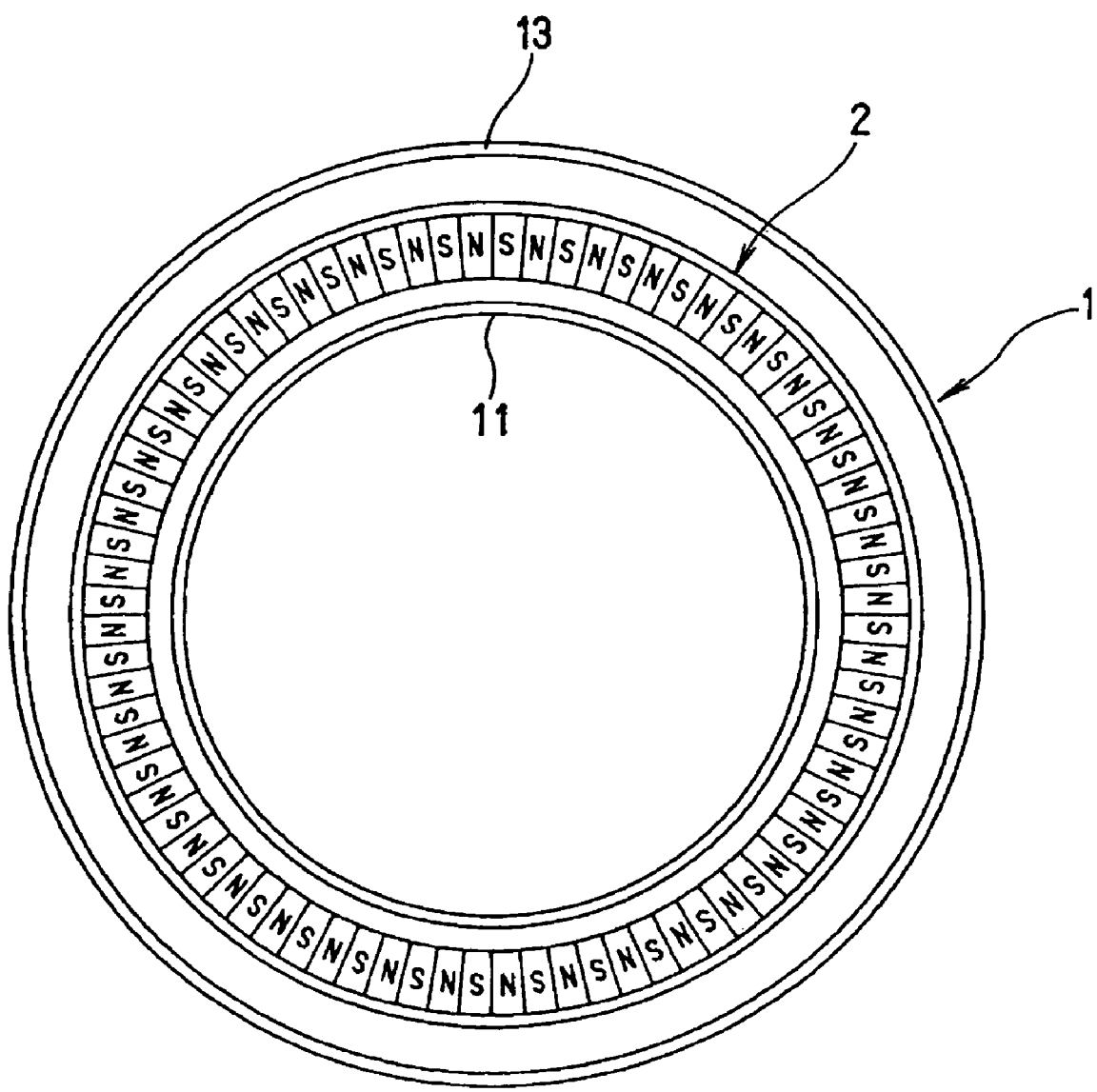
FIG. 2 is an explanatory view showing one example of a magnetized pattern of a pulsar ring main body.

A description will be given below of a preferable embodiment of a pulsar ring for a rotary encoder in accordance with the present invention with reference to the accompanying drawings. FIG. 1 is a sectional view showing a pulsar ring for a rotary encoder in accordance with a first embodiment of the present invention by cutting it along a plane passing through an axis O, and FIG. 2 is an explanatory view showing one example of a magnetized pattern of a pulsar ring main body.

In FIG. 1, reference numeral 200 denotes a bearing (a hub bearing) for rotatably supporting a wheel in a suspension apparatus of a motor vehicle. A lot of steel balls 203 are interposed between an outer ring 201 and an inner ring 202 arranged concentrically in an inner periphery of the outer ring 201. In this case, the outer ring 201 does not rotate and corresponds to a stationary side member described in the first aspect of the present invention, and the inner ring 202 rotates together with a shaft (not shown) and corresponds to a rotary side member described in the first aspect of the present invention.

As shown in FIG. 1, the pulsar ring for the rotary encoder in accordance with the present invention is provided with a mounting ring 1, a pulsar ring main body 2 integrally provided on an inner side surface of the mounting ring 1, and a seal ring 3 arranged in an inner side of the mounting ring 1.

In detail, the mounting ring 1 is manufactured by a non-magnetic material such as an aluminum, a stainless steel, a synthetic resin or the like, is formed to have approximately a C-shape in a shape (an illustrated sectional shape) obtained by cutting it along a plane passing through an axis O, and is constituted by an inner peripheral tube portion 11 pressure-inserted and fitted to an outer peripheral surface of the inner ring 202, a radial portion 12 extending to an outer peripheral side from an end portion thereof at the bearing outer portion A side, and an outer peripheral tube portion 13 concentrically extending in such a manner as to cover an outer periphery of the outer ring 201 in the same direction as the inner peripheral tube portion 11 from an outer peripheral end portion of the radial portion 12 and being positioned in proximity to the outer ring 201 via an axial clearance $G_1$ and a radial clearance $G_2$ which are continuous with each other. In this embodiment, the inner peripheral tube portion 11 corresponds to "one end" described in the first aspect of the present invention, and the outer peripheral tube portion 13 corresponds to "the other end" described in the first aspect of the present invention.

The pulsar ring main body 2 is vulcanized and thereby adhered to the inner side surface 12a of the radial portion 12 in the mounting ring 1, is made of a synthetic resin or a rubber-like elastic material mixed with magnetic powder which is one or more selected from a ferrite, a rare earth, an alnico and the like, and is a disc-shaped multipolar magnet in which south poles and north poles are alternately magnetized at a predetermined pitch in a circumferential direction, as shown in FIG. 2. Further, a crank angle measuring reference point (not shown) for detecting a specific position such as a top dead center of a piston of an engine, for example, or the like, can be set on the pulsar ring main body 2, by providing a portion (not shown) having a different magnetizing pitch at one position in the circumferential direction.

Further, an outer peripheral portion of the pulsar ring main body 2 is positioned in proximity to an inner peripheral surface of an end portion of the outer ring 201, and an annular clearance $G_3$ continuous with the radial clearance $G_2$ between the radial portion 12 of the mounting ring 1 and the outer ring 201 is formed between the both.

The seal ring 3 is constituted by an inner ring 31 fitted and attached to the mounting ring 1, and seal lips 32 and 33 integrally provided on an outer peripheral portion of the inner ring 31 and slidably brought into close contact with an inner peripheral surface of the outer ring 201. In other words, the seal ring 3 is tightly fitted and fixed to the inner ring 202 at the rotary side with the inner ring 31 via the mounting ring 1.

In detail, the inner ring 31 is manufactured by punching and pressing of a metal plate of a magnetic material, and is constituted by an inner peripheral tube portion 31a pressure-inserted and fitted to an outer peripheral surface of the inner peripheral tube portion 11 in the mounting ring 1, an inner peripheral radial portion 31b extending to an outer peripheral side from an end portion thereof at the bearing outer portion A side, a conical tube portion 31c extending from an outer peripheral end thereof toward a bearing inner portion B side so as to expand in diameter little by little, and an outer peripheral collar portion 31d extending to an outer peripheral side from a large-diameter end portion thereof. The inner peripheral radial portion 31b is brought into close contact with the inner peripheral portion of the pulsar ring main body 2.

The seal lips 32 and 33 are integrally formed on the inner ring 31 by steps of positioning and setting the inner ring 31, to which a vulcanization adhesive agent is previously applied, in a predetermined metal mold, clamping the metal mold, filling a rubber molding material within a molding cavity defined between the metal mold and the inner ring 31, and heating and pressurizing the material, and a common base portion 34 is adhered by vulcanization to the conical tube portion 31c and the outer peripheral collar portion 31d of the inner ring 31. Further, the seal lips 32 and 33 extend from an outer peripheral end of the base portion 34 toward an opposite side to the bearing inner portion B so as to expand in conical tubular shapes, and outer peripheries of leading end portions of the seal lips 32 and 33 are slidably brought into close contact with the inner peripheral surface of the outer ring 201.

Reference numeral 4 in FIG. 1 denotes a magnetic sensor. The magnetic sensor 4 is arranged at one position in a circumferential direction in the bearing outer portion A, and is fixed in a non-rotating state by a fixing member (not shown), and a detection surface 4a thereof is placed near to and is opposed to an outer side surface of the radial portion 12 in the mounting ring 1 in the axial direction.

According to the structure mentioned above of the pulsar ring for the rotary encoder of the present invention, since the mounting ring 1 is made of the non-magnetic material, a magnetic field corresponding to the magnetized pattern of the pulsar ring main body 2 provided on the inner side surface of the radial portion 12 runs to the outer side of the radial portion 12. Therefore, since the mounting ring 1 and the pulsar ring main body 2 integrally formed therewith rotate together with the inner ring 202 of the bearing 200, whereby the north poles and the south poles alternately pass through the front of the detection surface 4a of the magnetic sensor 4 in a rotating direction, a pulse-shaped signal having a wave form corresponding to a change of the magnetic field is output from the magnetic sensor 4, whereby it is possible to measure a rotation angle and a rotation speed.

In this case, soil dust, a foreign matter, muddy water and the like fly to the bearing outer portion A in consequence of traveling of a vehicle, however, the axial clearance $G_1$, the radial clearance $G_2$ and the annular clearance $G_3$, which are continuous with each other, are formed in a labyrinth shape between the mounting ring 1 and the pulsar ring main body 2 rotating together with the inner ring 202, and the non-rotating outer ring 201, a labyrinth seal effect is achieved by the rotation, and the soil dust, the foreign matter and the muddy water in the bearing outer portion A can not easily intrude into the inner side of the mounting ring 1. Accordingly, since the pulsar ring main body 2 is protected by the mounting ring 1, and is hardly exposed to an external disturbance, it is possible to maintain a stable magnetic pattern.

On the other hand, since the inner ring 31 of the seal ring 3 is integrally fitted and attached to the mounting ring 1, the seal ring 3 is rotated together with the inner ring 202 of the bearing 200 via the mounting ring 1, and the seal lips 32 and 33 on the outer periphery are brought into close contact with the inner peripheral surface of the non-rotating outer ring 201 so as to slide, thereby achieving a sealing function. Accordingly, even if muddy water, soil dust or the like slightly intrudes into the inner side of the mounting ring 1 through the axial clearance $G_1$, the radial clearance $G_2$ and the annular clearance $G_3$ which are continuous with each other, it is possible to securely prevent them from intruding into the bearing inner portion B, and it is possible to prevent grease from flowing out of the bearing inner portion B.

Further, since the inner peripheral radial portion 31b of the inner ring 31 in the seal ring 3 is brought into close contact with the inner peripheral portion of the pulsar ring main body 2, muddy water, soil dust or the like slightly intruded into the inner side of the mounting ring 1 does not intrude into the bearing inner portion B from the fitting portion between the inner peripheral tube portion 11 of the mounting ring 1 and the inner peripheral tube portion 31a of the inner ring 31.

Figure 3:
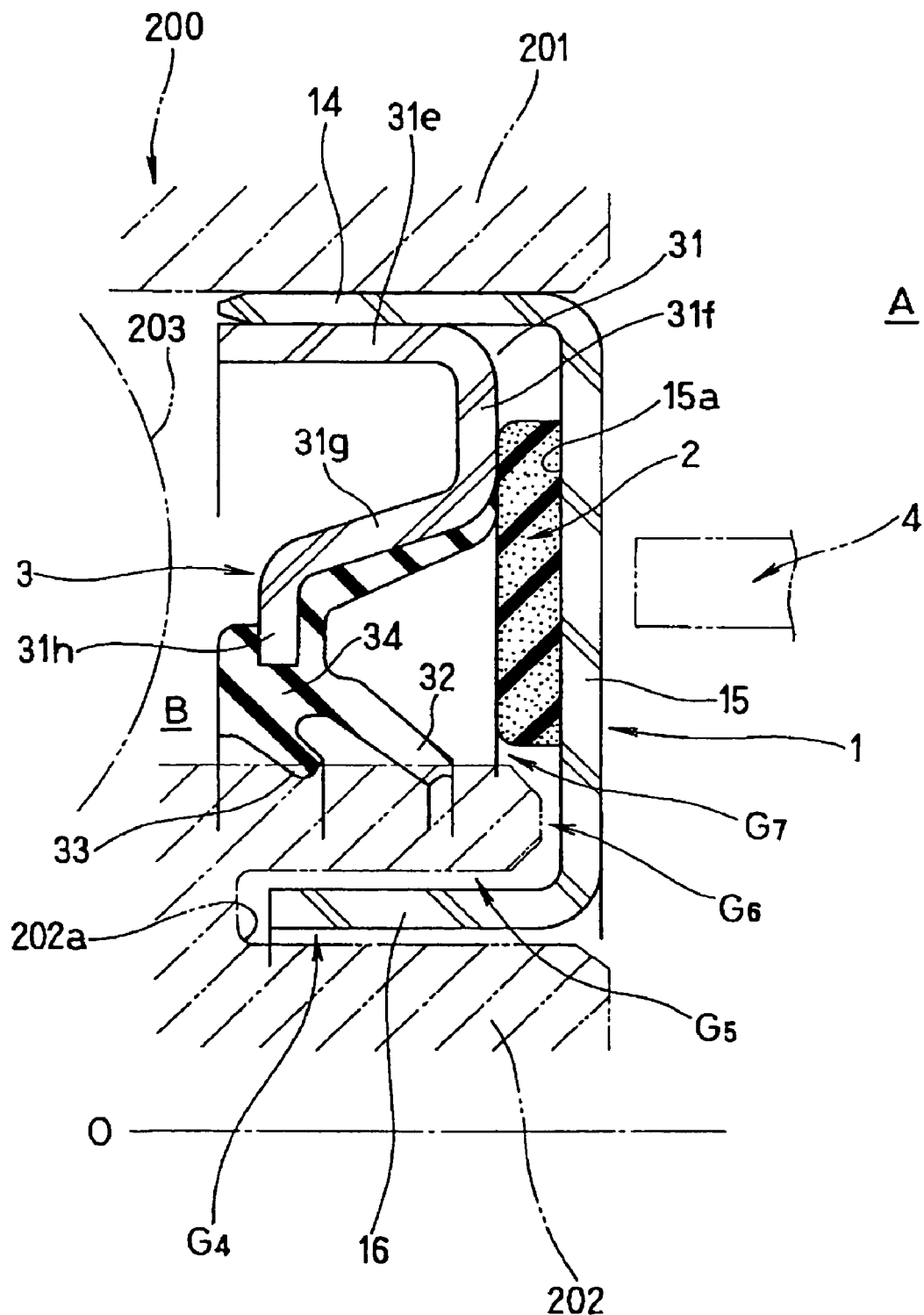
FIG. 3 is a sectional view showing a pulsar ring for a rotary encoder in accordance with a second embodiment of the present invention by cutting it along a plane passing through an axis O.
Figure 4:
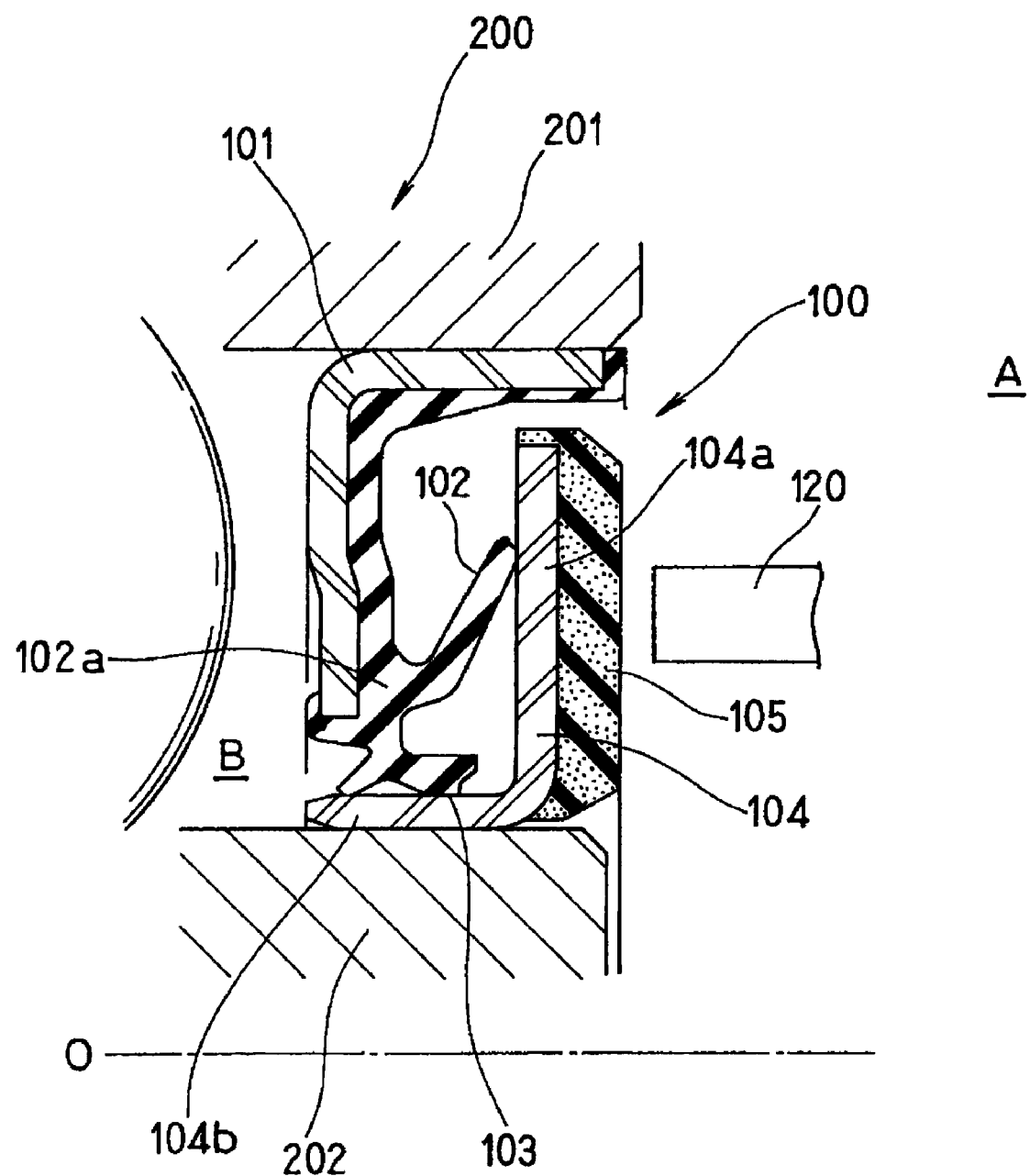
FIG. 4 is a sectional view showing a conventional pulsar ring for a rotary encoder integrally provided in a sealing apparatus by cutting it along a plane passing through an axis O.

Next, FIG. 3 is a sectional view showing a pulsar ring for a rotary encoder in accordance with a second embodiment of the present invention by cutting it along a plane passing through an axis O. The pulsar ring is provided with the mounting ring 1, the pulsar ring main body 2 integrally provided on the inner side surface of the mounting ring 1, and the seal ring 3 arranged in the inner side of the mounting ring 1, similarly to the first embodiment mentioned above, and has a sectional shape symmetrical in a radial direction with the cross sectional shape shown in FIG. 1. Further, in this embodiment, the outer ring 201 rotates together with a shaft (not shown), and corresponds to the rotary side member described in the first aspect of the present invention, and the inner ring 202 does not rotate, and corresponds to the stationary side member described in the first aspect of the present invention.

In detail, the mounting ring 1 is manufactured by a non-magnetic material such as an aluminum, a stainless steel, a synthetic resin or the like, is formed to have approximately a C-shape in a shape (an illustrated cross sectional shape) obtained by cutting it along a plane passing through an axis O, and is constituted by an outer peripheral tube portion 14 pressure-inserted and fitted to an inner peripheral surface of the outer ring 201 at the rotary side, a radial portion 15 extending to an inner peripheral side from an end portion thereof at the bearing outer portion A side, and an inner peripheral tube portion 16 extending in the same direction as the outer peripheral tube portion 14 from an inner peripheral end portion of the radial portion 15 and being inserted to a tubular groove 202a formed in the non-rotating inner ring 202, to thereby form an inner peripheral side axial clearance $G_4$, an outer peripheral side axial clearance $G_5$ and a radial clearance $G_6$, which are continuous with each other, between the mounting ring 1 and the inner ring 202. In this embodiment, the outer peripheral tube portion 14 corresponds to "one end" described in the first aspect of the present invention, and the inner peripheral tube portion 16 corresponds to "the other end" described in the first aspect of the present invention.

The pulsar ring main body 2 is vulcanized and thereby adhered to an inner side surface 15a of the radial portion 15 in the mounting ring 1, is made of a synthetic resin or a rubber-like elastic material mixed with magnetic powder which is one or more selected from a ferrite, a rare earth, an alnico and the like, and is structured similarly to that of the first embodiment.

Further, an inner peripheral portion of the pulsar ring main body 2 is positioned in proximity to an outer peripheral surface of an end portion of the inner ring 202, and an annular clearance $G_7$ continuous with the radial clearance $G_6$ between the radial portion 15 of the mounting ring 1 and the inner ring 202 is formed between the both.

The seal ring 3 is constituted by an inner ring 31 fitted and attached to the mounting ring 1, and seal lips 32 and 33 integrally provided on an inner peripheral portion of the inner ring 31 and slidably brought into close contact with an outer peripheral surface of the inner ring 202. In other words, the seal ring 3 is tightly fitted and fixed to the outer ring 201 at the rotary side with the inner ring 31 via the mounting ring 1.

In detail, the inner ring 31 is manufactured by punching and pressing of a metal plate of a magnetic material, and is constituted by an outer peripheral tube portion 31e pressure-inserted and fitted to an inner peripheral surface of the outer peripheral tube portion 14 in the mounting ring 1, an outer peripheral radial portion 31f extending to an inner peripheral side from an end portion thereof at the bearing outer portion A side, a conical tube portion 31g extending from an inner peripheral end thereof toward a bearing inner portion B side so as to reduce in diameter little by little, and an inner peripheral collar portion 31h extending to an inner peripheral side from a small-diameter end portion thereof. The outer peripheral radial portion 31f is brought into close contact with the outer peripheral portion of the pulsar ring main body 2.

The seal lips 32 and 33 are integrally formed on the inner ring 31 by steps of positioning and setting the inner ring 31, to which a vulcanization adhesive agent is previously applied, in a predetermined metal mold, clamping the metal mold, filling a rubber molding material within a molding cavity defined between the metal mold and the inner ring 31, and heating and pressurizing the material, and a common base portion 34 is adhered by vulcanization to the conical tube portion 31g and the inner peripheral collar portion 31h of the inner ring 31. Further, the seal lips 32 and 33 extend from an inner peripheral end of the base portion 34 toward an opposite side to the bearing inner portion B so as to narrow in conical tubular shapes, and inner peripheries of leading end portions of the seal lips 32 and 33 are slidably brought into close contact with the outer peripheral surface of the inner ring 202.

The pulsar ring for the rotary encoder in FIG. 3 structured as mentioned above can basically achieve the same effect as that of FIG. 1. In other words, since the pulsar ring main body 2 is protected by the mounting ring 1, and is hardly exposed to an external disturbance, it is possible to maintain a stable magnetic pattern. Further, even if muddy water, soil dust or the like slightly intrudes into the inner side of the mounting ring 1, the seal ring 3 can securely prevent them from intruding into the bearing inner portion B, and prevent grease from flowing out of the bearing inner portion B.

Further, since the inner peripheral tube portion 16 of the mounting ring 1 is inserted to the tubular groove 202a formed in the inner ring 202, whereby the long axial clearances $G_4$ and $G_5$ are formed in a shape of being folded back in the axial direction, it is possible to increase a labyrinth seal effect on the basis of a more complicated labyrinth shape than that of FIG. 1.

INDUSTRIAL APPLICABILITY

The present invention relates to a pulsar ring utilized in a magnetic rotary encoder for detecting a rotation, and can provide the pulsar ring which can maintain a stable magnetic pattern.

What is claimed is:
1. A sealing device with a pulsar ring for a rotary encoder, comprising:
 a mounting ring made of a non-magnetic material, with one end being tightly fitted and fixed to a rotary side member and the other end being positioned in proximity to a stationary side member via clearances defining labyrinth seal structure;
 a pulsar ring main body formed by a synthetic resin or an elastomeric material mixed with magnetic powder, magnetized so as to have multiple poles and integrally provided on an inner side surface of said mounting ring; and
 a seal ring arranged in an inner side of the mounting ring; wherein said seal ring includes an inner annular ring tightly fitted and fixed to said one end of the mounting ring, and a seal lip formed integrally with the inner annular ring, and slidably close contacting with the stationary side member.
2. A sealing device with a pulsar ring for a rotary encoder as claimed in claim 1, wherein the pulsar ring main body is in close contact with the seal ring.

* * * * *